United States Patent
Pontious et al.

(10) Patent No.: US 11,727,409 B2
(45) Date of Patent: Aug. 15, 2023

(54) LIMITED USE TEMPORARY CREDIT ACCOUNT

(71) Applicant: BREAD FINANCIAL PAYMENTS, INC., Columbus, OH (US)

(72) Inventors: Timothy D. Pontious, Gahanna, OH (US); Celeste Rechner, Upper Arlington, OH (US)

(73) Assignee: BREAD FINANCIAL PAYMENTS, INC., Columbus, OH (US)

( * ) Notice: Subject to any disclaimer, the term of this patent is extended or adjusted under 35 U.S.C. 154(b) by 0 days.

(21) Appl. No.: 17/499,855

(22) Filed: Oct. 12, 2021

(65) Prior Publication Data
US 2022/0036453 A1   Feb. 3, 2022

Related U.S. Application Data

(63) Continuation of application No. 15/788,538, filed on Oct. 19, 2017, now abandoned.

(60) Provisional application No. 62/505,633, filed on May 12, 2017.

(51) Int. Cl.
G06Q 20/40 (2012.01)
G06Q 20/24 (2012.01)
G06Q 20/32 (2012.01)
G06Q 20/38 (2012.01)
G06Q 20/34 (2012.01)

(52) U.S. Cl.
CPC ......... *G06Q 20/4033* (2013.01); *G06Q 20/24* (2013.01); *G06Q 20/3221* (2013.01); *G06Q 20/3274* (2013.01); *G06Q 20/351* (2013.01); *G06Q 20/385* (2013.01)

(58) Field of Classification Search
CPC ... G06Q 20/24; G06Q 20/3221; G06Q 20/385
See application file for complete search history.

(56) References Cited

U.S. PATENT DOCUMENTS

| | | |
|---|---|---|
| 5,864,830 A | 1/1999 | Armetta et al. |
| 7,315,828 B1 | 1/2008 | McCarthy et al. |
| 7,739,168 B2 | 6/2010 | Gillin et al. |
| 7,967,196 B1 | 6/2011 | Bierbaum et al. |
| 9,147,152 B2 | 9/2015 | Nack et al. |
| 9,639,894 B1 | 5/2017 | Arnone et al. |
| 10,380,596 B1 | 8/2019 | Butler et al. |

(Continued)

*Primary Examiner* — Bennett M Sigmond
*Assistant Examiner* — Marla Hudson

(57) ABSTRACT

A limited use temporary credit account is disclosed. The method includes displaying, on a display of a mobile device, a temporary credit account, the temporary credit account correlated with a newly approved non-integrated credit account, the temporary credit account including: a temporary account number; a temporary expiration date; and a temporary security code. Incorporating a time constraint into the temporary credit account displayed on the mobile device, the time constraint limiting an amount of time the temporary credit account is displayed on the mobile device and limiting an amount of time the temporary credit account is available for making a purchase. Integrating a credit limit reduction into the temporary credit account displayed on the mobile device, the credit limit reduction reducing an available credit on the temporary credit account to an amount less than a credit available on the newly approved non-integrated credit account.

13 Claims, 5 Drawing Sheets

(56) References Cited

U.S. PATENT DOCUMENTS

| | | |
|---|---|---|
| 2006/0213983 A1 | 9/2006 | Walker et al. |
| 2011/0137748 A1* | 6/2011 | Baher ................. G06Q 20/40 709/219 |
| 2011/0153462 A1 | 6/2011 | Granich |
| 2012/0150605 A1 | 6/2012 | Isaacson et al. |
| 2012/0150743 A1 | 6/2012 | Isaacson et al. |
| 2012/0197794 A1 | 8/2012 | Grigg et al. |
| 2012/0239474 A1 | 9/2012 | Healy et al. |
| 2013/0290172 A1 | 10/2013 | Mashinsky |
| 2014/0070001 A1 | 3/2014 | Sanchez et al. |
| 2015/0262291 A1* | 9/2015 | West ................. G06Q 30/0269 705/14.66 |
| 2016/0171498 A1 | 6/2016 | Wang et al. |
| 2016/0180329 A1 | 6/2016 | Suberville |
| 2016/0210600 A1 | 7/2016 | Sobek |
| 2016/0217461 A1 | 7/2016 | Gaddam et al. |
| 2017/0046695 A1 | 2/2017 | Collings |
| 2017/0161781 A1 | 6/2017 | Parekh |
| 2017/0169507 A1 | 6/2017 | Skaarup et al. |
| 2017/0221046 A1 | 8/2017 | Mikuriya et al. |
| 2018/0330383 A1 | 11/2018 | Pontious et al. |
| 2019/0005558 A1 | 1/2019 | Morris et al. |
| 2019/0370805 A1 | 12/2019 | Van Os et al. |
| 2020/0019967 A1 | 1/2020 | Abdi Taghi Abad et al. |
| 2020/0193413 A1 | 6/2020 | Jangama et al. |
| 2020/0193423 A1 | 6/2020 | Jangama et al. |

\* cited by examiner

500

DISPLAY, ON A DISPLAY OF A MOBILE DEVICE, A TEMPORARY CREDIT ACCOUNT, THE TEMPORARY CREDIT ACCOUNT CORRELATED WITH A NEWLY APPROVED NON-INTEGRATED CREDIT ACCOUNT, THE TEMPORARY CREDIT ACCOUNT INCLUDING: A TEMPORARY ACCOUNT NUMBER; A TEMPORARY EXPIRATION DATE; AND A TEMPORARY SECURITY CODE
502

INCORPORATE A TIME CONSTRAINT INTO THE TEMPORARY CREDIT ACCOUNT DISPLAYED ON THE MOBILE DEVICE. THE TIME CONSTRAINT LIMITING AN AMOUNT OF TIME THE TEMPORARY CREDIT ACCOUNT IS DISPLAYED ON THE MOBILE DEVICE AND LIMITING AN AMOUNT OF TIME THE TEMPORARY CREDIT ACCOUNT IS AVAILABLE FOR MAKING A PURCHASE
504

INTEGRATE A CREDIT LIMIT REDUCTION INTO THE TEMPORARY CREDIT ACCOUNT DISPLAYED ON THE MOBILE DEVICE, THE CREDIT LIMIT REDUCTION REDUCING THE AVAILABLE CREDIT AVAILABLE ON THE TEMPORARY CREDIT ACCOUNT TO AN AMOUNT LESS THAN THE CREDIT AVAILABLE ON THE NEWLY APPROVED NON-INTEGRATED CREDIT ACCOUNT
506

FIG. 5

LIMITED USE TEMPORARY CREDIT ACCOUNT

CROSS-REFERENCE

This application is a continuation and claims priority to and the benefit of U.S. patent application Ser. No. 15/788,538, filed on Oct. 19, 2017, entitled "LIMITED USE TEMPORARY CREDIT ACCOUNT" by Timothy D. Pontious et al., and assigned to the assignee of the present application, hereby incorporated by reference in its entirety.

U.S. patent application Ser. No. 15/788,538 claims priority to and benefit of U.S. Provisional Patent Application No. 62/505,633 filed on May 12, 2017, entitled "LIMITED USE TEMPORARY CREDIT ACCOUNT" by Timothy D. Pontious et al., and assigned to the assignee of the present application, the disclosure of which is hereby incorporated by reference in its entirety.

BACKGROUND

Company specific and brand specific credit cards provide significant value to consumer, brand and issuer. By issuing a brand specific credit card, the brand and issuer are able to tailor rewards offers, provide loyalty discounts and maintain and promote consumer brand loyalty. Similarly, the consumer receives the perks from the reward offers, the loyalty discounts and often provides good word provider recommendations via word of mouth, social networks, interact rating sites, and the like.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 5 depicts a flowchart of a method for providing a limited use temporary credit account on a display screen of a mobile device, in accordance with an embodiment.

DESCRIPTION OF EMBODIMENTS

Figure 1:
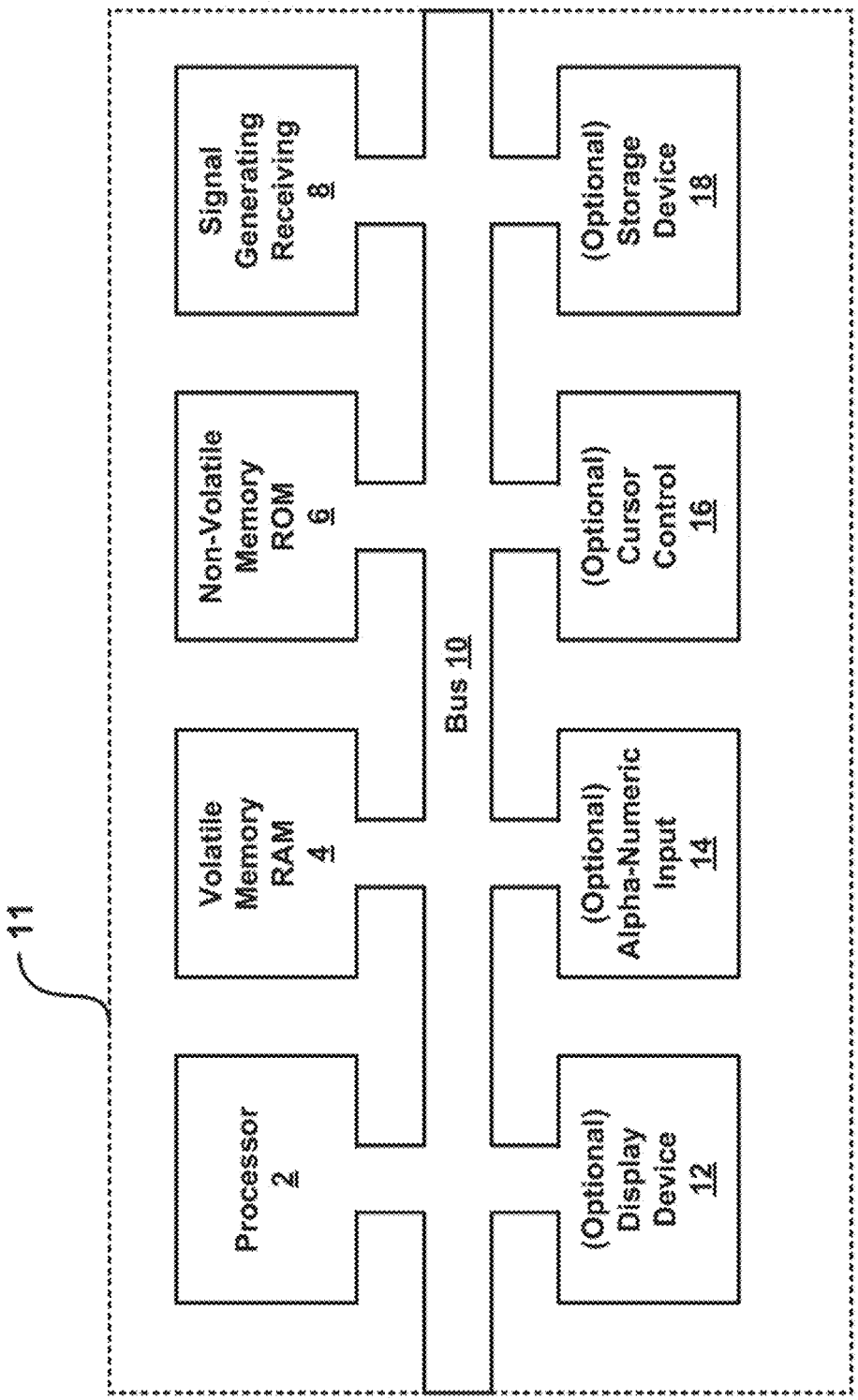
FIG. 1 is a block diagram of an example computer system with which or upon which various embodiments may be implemented.

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. In some embodiments, all or portions of the electronic computing devices, units, and components described herein are implemented in hardware, a combination of hardware and firmware, a combination of hardware and computer-executable instructions, or the like. In one embodiment, the computer-executable instructions are stored in a non-transitory computer-readable storage medium. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

Notation and Nomenclature

Unless specifically stated otherwise as apparent from the following discussions, it is appreciated that throughout the present Description of Embodiments, discussions utilizing terms such as "selecting", "outputting", "allowing," "limiting," "issuing," "preventing," "inputting", "providing", "receiving", "utilizing", "obtaining", "performing", "accessing", "authorizing" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

An integrated credit application refers to an application for a credit account that is integrated with the point of sale (POS), such as at the register at the time of purchase or during a checkout procedure, where the resultant credit account is available to use at the time of application/checkout at the POS.

A non-integrated credit application refers to an application for a credit account that is not integrated with the POS, such as at the register at the time of purchase or during a checkout procedure, where the resultant credit becomes available for consumer use when the credit card arrives after a given number of days. E.g., such as by mail, etc.

A brand specific credit account refers to a credit account that is available for use only at locations related to the brand. E.g., Tim's store has a brand specific credit account that allows Celeste, a Tim's store customer, to purchase with credit at Tim's store using Tim's brand specific credit account. However, Celeste cannot use the Tim's brand specific credit account to make purchases at her local gas station. A brand specific credit account may also be referred to as a private label card, e.g., a card that can be used for purchases only at the store on the label.

A co-branded card refers to a card that has a store on the label as well as an underlying credit card network with an accompanying logo (e.g., Visa™, Mastercard™, etc.). As such, a co-branded card may be used for purchases at the store on the label as well as at other stores that accept that credit card network's credit cards.

Importantly, the embodiments of the present invention, as will be described herein, provide a limited use, time constrained, credit limit reduced, stop-gap temporary credit account capability which differs significantly from the conventional processes for providing a credit account in a non-integrated environment. In conventional non-integrated approaches, after the credit account is applied for, the consumer must wait for the credit card to arrive in the mail before the credit card account can be utilized. Such conventional approaches cause a significant delay between the application for the credit account and the utilization of the credit account, and often cause an initial purchase, at the time of the user's application for the card, to be skipped or reduced in size. That is, the user is not as motivated to make a purchase, or add additional items to the purchase, as the credit account is not presently available.

Similarly, there are some integrated solutions whereby the customer receives a printout from the register that has their account number on it, and the customer can use the information on the receipt until the card arrives. Such printout approaches provide an account number on the receipt that can be lost, misplaced or otherwise found by another party that will then have the account number and information available to make purchases in numerous locations until the card is identified as lost/stolen. Because a customer is not used to worrying about information on a receipt being the full credit card information, the risk of loss is higher. Further, since the receipt includes the actual account information, if it is lost, there can be a significant amount of fraudulent charges, up to and possibly beyond the credit limit, before the loss is identified.

Instead, the present embodiments, as will be described and explained below in detail, provide a previously unknown procedure for providing a limited use, time constrained, credit limit reduced, stop-gap temporary credit capability that allows a customer to make an initial purchase, after applying for a non-integrated credit account, with the non-integrated credit account that provides a customer solution to the normally time-challenged aspects of non-integrated credit account issuing process while also providing a reduced risk to the credit account provider. Thus, embodiments of the present invention provide a novel stop-gap measure which extends well beyond what was previously available.

As will be described in detail, the various embodiments of the present invention do not merely implement conventional non-integrated credit account processes on a computer. Instead, the various embodiments of the present invention, in part, provide a previously unknown procedure for providing a limited use, time constrained, credit limit reduced, stop-gap credit capability that allows a customer to make an initial purchase, after applying for a non-integrated credit account, with the non-integrated credit account that provides a customer solution to the normally time-challenged aspects of non-integrated credit account issuing process while also providing a reduced risk to the credit account provider. Hence, embodiments of the present invention provide a novel process for non-integrated credit account, limited use, time constrained, credit limit reduced, stop-gap credit capability which is necessarily rooted in computer technology to overcome a problem specifically arising in the realm of non-integrated credit account application utilization delay.

Moreover, the embodiments do not recite a mathematical algorithm; nor do they recite a fundamental economic or longstanding commercial practice. Instead, they address a business challenge of how a customer can pay with a credit account when a customer has applied for that same credit account in a non-integrated manner, while also reducing credit provider risk. Thus, the embodiments do not "merely recite the performance of some business practice known from the pre-Internet world along with the requirement to perform it on the Internet". Instead, the embodiments are necessarily rooted in retail purchase and credit account technology in order to overcome a problem specifically arising in the realm of non-integrated credit account application utilization delay.

Example Computer System

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

With reference now to FIG. 1, portions of the technology for providing a communication composed of computer-readable and computer-executable instructions that reside, for example, in non-transitory computer-usable storage media of a computer system. That is, FIG. 1 illustrates one example of a type of computer that can be used to implement embodiments of the present technology. FIG. 1 represents a system or components that may be used in conjunction with aspects of the present technology. In one embodiment, some or all of the components described herein may be combined with some or all of the components of FIG. 1 to practice the present technology.

FIG. 1 shows a block diagram of an embodiment of an example computer system 11 used in accordance with various embodiments. It should be appreciated that computer system 11 is not strictly limited to be a computer system. As such, computer system 11 of the present embodiment may be well suited to be any type of computer device (e.g., server computer, portable computer device, desktop computer, mobile phone, pager, personal digital assistant, etc.). Within the present discussions, certain processes and steps are discussed that are realized, in one embodiment, as a series of instructions (e.g., software program) that reside within computer readable memory units and executed by a processor(s) of computer system 11. When executed, the instructions cause computer system 11 to perform specific actions and exhibit specific behavior that may be described in detail herein. For example, computer 11 may be used to implement aspects of methods described herein, such as the method illustrated by flow diagrams 400-500 of FIGS. 4-5, respectively.

Computer system 11 of FIG. 1 comprises an address/data bus 10 for communicating information, one or more central processors 2 coupled with bus 10 for processing information and instructions. Central processor unit(s) 2 may be a microprocessor or any other type of processor. The computer system 11 also includes data storage features such as a computer usable volatile memory unit 4 (e.g., random access memory, static RAM, dynamic RAM, etc.) coupled with bus 10 for storing information and instructions for central processor(s) 2, a computer usable non-volatile memory unit 6 (e.g., read only memory, programmable ROM, flash memory, EPROM, EEPROM, etc.) coupled with bus 10 for storing static information and instructions for processor(s) 102. Computer system 11 also includes one or more signal generating and receiving devices 8 coupled with bus 10 for enabling computer system 11 to interface with other electronic devices and computer systems. The communication interface(s) S of the present embodiment may include wired and/or wireless communication technology.

Optionally, computer system 10 may include an alphanumeric input device 114 including alphanumeric and function keys coupled to the bus 110 for communicating information and command selections to the central processor(s) 102. The computer system 10 can include an optional cursor control or cursor directing device 116 coupled to the bus 10 for communicating user input information and command selections to the central processor(s) 102. The cursor-directing device 116 may be implemented using a number of well-known devices such as a mouse, a track-ball, a track-pad, an optical tracking device, and a touch screen, among others. Alternatively, it may be appreciated that a cursor may be directed and/or activated via input from the alphanumeric input device 114 using special keys and key sequence commands. The present embodiment is also well suited to directing a cursor by other means such as, for example, voice commands.

The computer system 10 of FIG. 1 may also include one or more optional computer usable data storage devices 18 such as a magnetic or optical disk and disk drive (e.g., hard drive or floppy diskette) coupled with bus 10 for storing information and instructions. An optional display device 12 may be coupled to bus 10 of computer system 10 for displaying video and/or graphics. It should be appreciated that optional display device 12 may be a cathode ray tube (CRT), flat panel liquid crystal display (LCD), field emission display (FED), plasma display or any other display device suitable for displaying video and/or graphic images and alphanumeric characters recognizable to a user.

Figure 2:
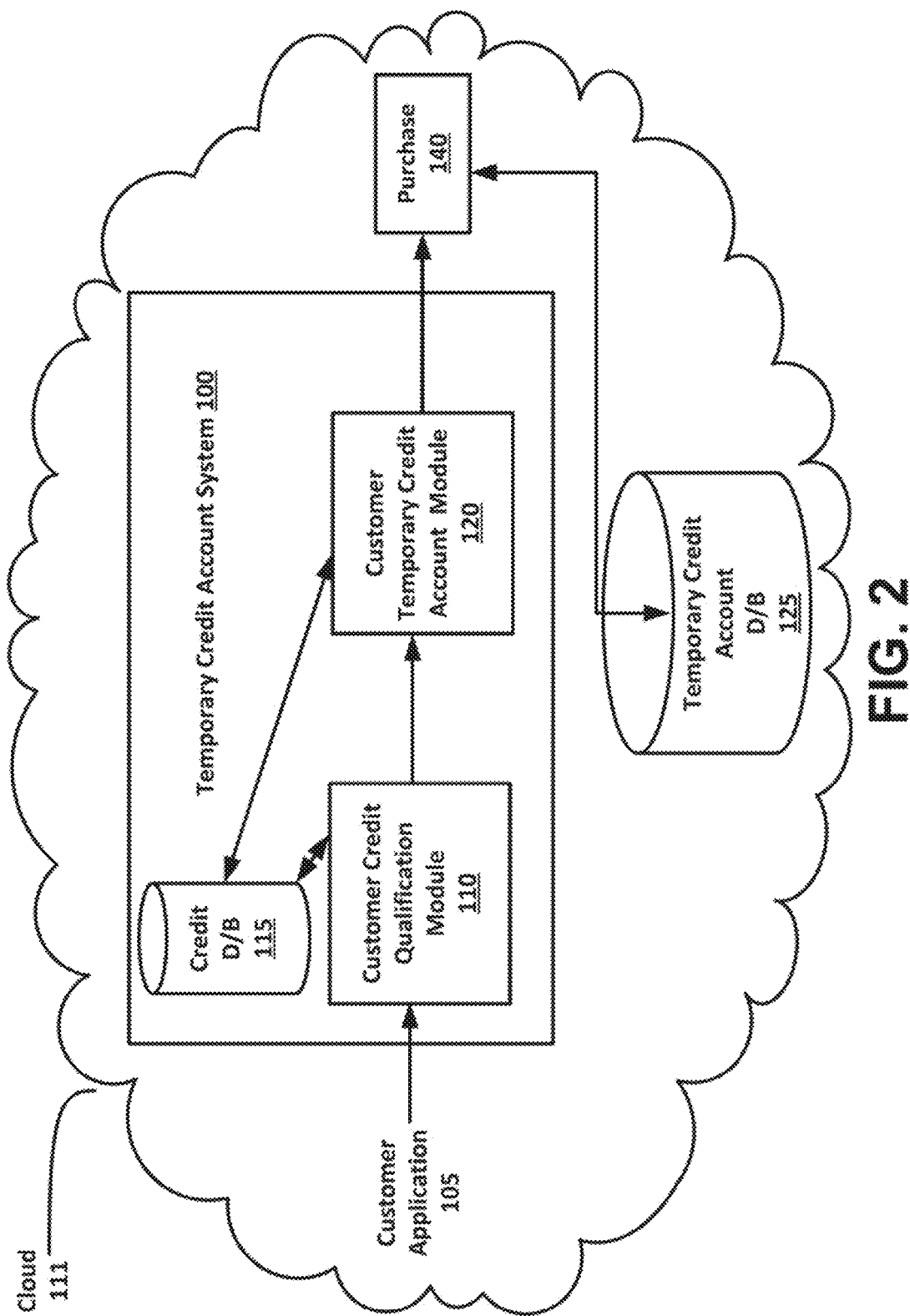
FIG. 2 is a block diagram of a limited use temporary credit account system, in accordance with an embodiment.

FIG. 2 is a block diagram of a limited use temporary credit account system 100 shown in accordance with an embodiment. In general, the limited use temporary credit account is presented on a display screen of a user's mobile device. The limited use, time constrained, reduced credit limit, stop-gap temporary credit account includes a temporary account number that can be issued to a customer while the customer waits to receive an actual credit card with an associated credit card number from the credit provider. The limited use temporary credit account has a valid temporary account number, a valid temporary expiration date and a valid temporary security code. For the rest of the discussion, the term temporary credit account is used to describe the limited use, time constrained, reduced credit limit, temporary credit account.

In some instances, the credit providing entity manages credit transactions according to various standards and rules. For example, the payment card industry (PO) rules prohibit giving a temporary credit account to a customer that is tied to a user's primary account number (PAN). Additionally, any temporary credit account needs to have a valid account number, a valid expiration date and a valid security code so that transactions can be completed on a merchant credit card machine.

To conform to the PCI rules, embodiments generate a temporary credit account number for a qualified customer that is not tied to the customer's PAN. The temporary credit account number also has a valid temporary account number that is not tied to the customer's PAN, a valid temporary expiration date and a valid temporary security code so that it works with conventional payment processing systems. The temporary credit account number enables a user to complete a non-integrated credit card application and then actually make a purchase using the newly obtained credit line.

In an embodiment, temporary credit account system 100 includes customer credit qualification module 110 and customer temporary credit account access module 120. In general, temporary credit account system 100 receives a customer application 105 for a credit account. Customer credit qualification module 110 will access credit database 115 to determine if the customer qualifies for the credit account. In one embodiment, various modules shown in FIG. 2 communicate over a cloud 111 infrastructure. An example of cloud 111 is a network such as the Internet or the like.

If the customer qualifies, customer credit qualification module 110 provides the qualification information to customer temporary credit account module 120. Customer temporary credit account module 120 will then add the customer information to the temporary credit account database 125. The customer then has the option to utilize the temporary credit account to make a purchase 140.

In one embodiment, the customer may use a smart device to apply for the credit account. Examples of a smart device include, but are not limited to, a mobile phone, tablet, smart glasses, smart watch, and the like. In general, the smart device provides the customer application 105 and accesses credit account database 125 via wireless connectivity such as 3G, 4G, WiFi, Bluetooth, and the like.

In an embodiment, for example in a brick and mortar store, a customer has selected one or more goods to purchase. Before the purchase, the customer is offered, or accesses an offer for, a credit account. By answering a few questions, the customer applies for the credit account and upon approval is provided access to a temporary credit account number that can be used immediately for purchases. In one embodiment, immediate promotional offers may be presented to the customer upon issuance of the card to promote usage.

In another embodiment, the offer for the credit account may be on a poster, flyer, business card or the like at the point of sale. In one embodiment, the poster includes a barcode, web address or the like. In this case, the customer applies for the credit account by scanning the barcode with a smart device. The scanning of the barcode will push the smart device to the credit account application website. By answering a few questions, the customer applies for the credit account. In one embodiment, immediate promotional offers may be presented to the customer upon issuance of the card to promote usage. For example, in one embodiment, an electronic coupon may be issued to promote usage on the day of issuance.

In one embodiment, when customer credit qualification module 110 receives customer application 105, customer credit qualification module 110 acts in real-time to qualify the customer for the credit account. In other words, the qualification process is performed in a few minutes or less.

In one embodiment, part of the qualifying process includes providing a credit available amount. In one embodiment, the initially available credit line may be a constant predetermined amount for every customer or the initially available credit line may be variable and based on customer credit history, credit score, and the like.

After the customer is qualified, customer credit qualification module 110 provides the qualification information to customer temporary credit account module 120. Customer temporary credit account module 120 then adds the customer temporary credit account number to temporary credit account number database 125.

Figure 3:
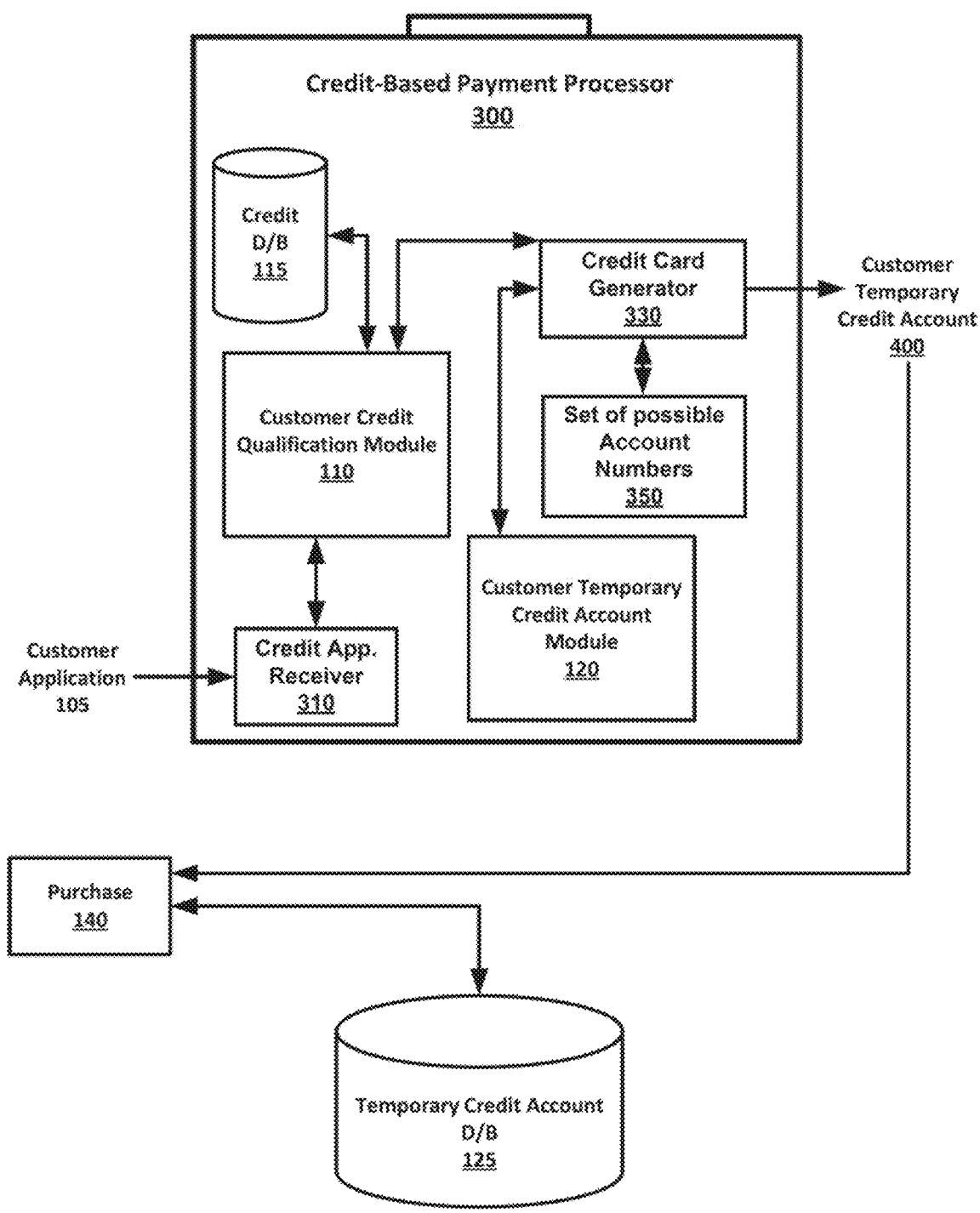
FIG. 3 is a block diagram of a credit-based payment processor using a limited use temporary credit account system, in accordance with an embodiment.

FIG. 3 is a block diagram of a credit-based payment processor 300 using a temporary credit account system, in accordance with an embodiment. System 300 of FIG. 3 is similar to temporary credit account system 100 of FIG. 2, but shows additional functionality such as a credit application receiver 310, a credit card generator, a possible set of account numbers 350 and a temporary credit account 400.

In one embodiment, the credit-based payment processor has a set of possible account numbers 350 from which every customer account is pulled from. The set of possible account numbers 350 is a set of numbers that conform to credit-based transaction rules and standards. In one embodiment, a subset of the set of possible account numbers is reserved for issuing temporary credit account numbers.

In one embodiment, a customer application is received at the credit application receiver 310. The credit application receiver communicates with the customer credit qualification module 110 and credit database 115 to qualify the customer application 105. Once the customer is qualified, a credit card generator 330 pulls a valid credit card number, valid expiration date and a valid security code from the set of possible account numbers 350 to generate a customer temporary credit account 400.

In one embodiment, the valid credit card number, valid expiration date and a valid security code of the customer temporary credit account 400 are not tied directly to the customer's Primary Account Number. In one embodiment, the customer temporary credit account module 120 may limit purchases on the customer temporary credit account 400 to a limit well below the customer's approved credit amount for fraud protection purposes. In another embodiment, the customer temporary credit account module 120 may limit the number of purchases or set a very short expiration date for the customer temporary credit account 400. In one embodiment, the credit limit is increased after the physical credit card is issued.

In one embodiment, the customer temporary credit account 400 functions in conventional credit-based transactions as if it were tied to a user's primary account number. In one embodiment, the temporary credit account conforms to a payment card industry (PCI) standard.

In one embodiment, the customer temporary credit account module automatically prevents purchases using the temporary credit account after a predetermined period of time.

In one embodiment, the customer temporary credit account module limits purchase amounts to a predetermined amount.

Temporary Credit Account Operation

Figure 4:
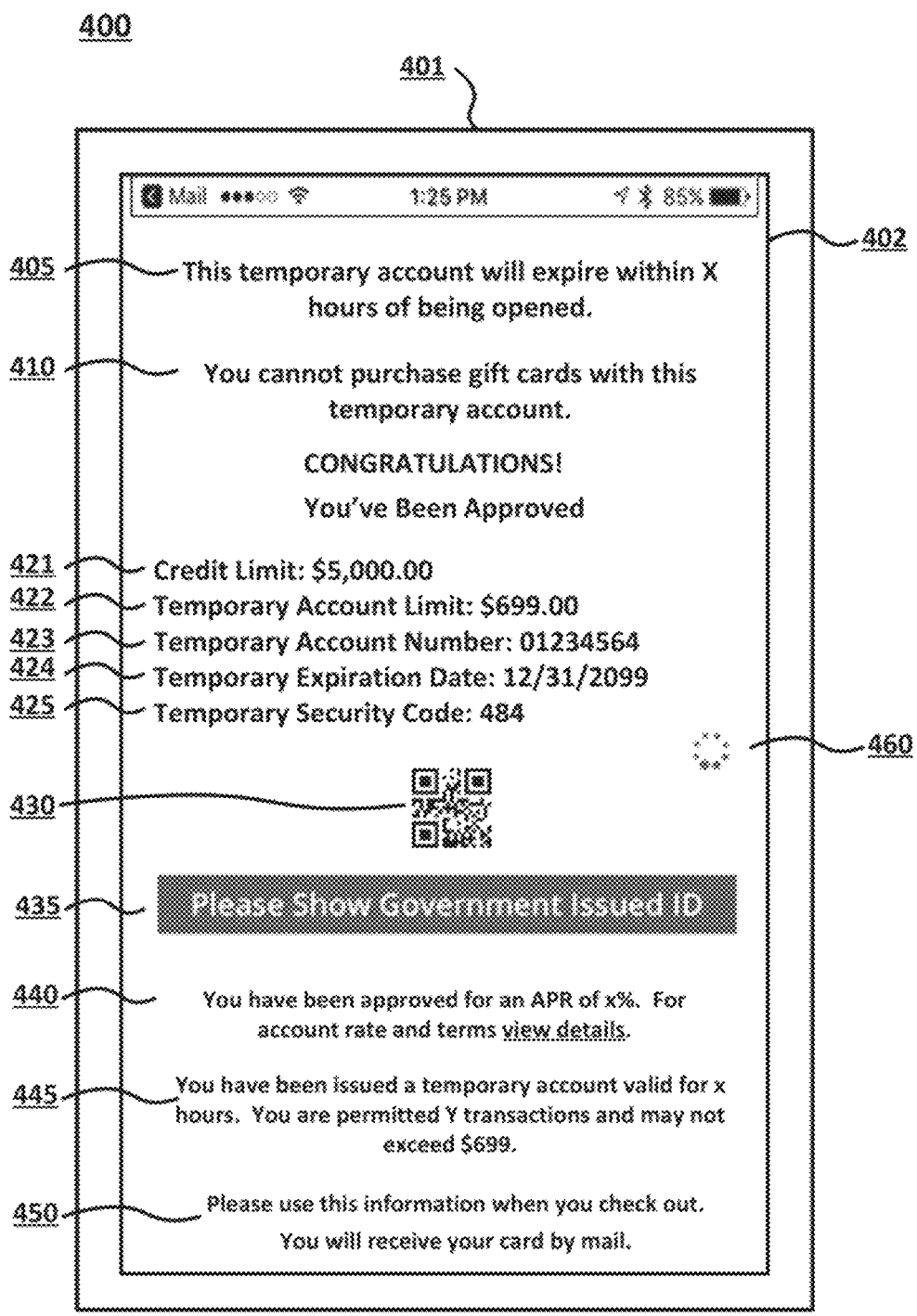
FIG. 4 depicts a block diagram of a limited use temporary credit account presented on a display screen of a mobile device, in accordance with an embodiment.

With reference now to FIG. 4, a block diagram of a temporary credit account 400 as presented on a display screen 402 of a mobile device 401 is shown in accordance with an embodiment. Although a number of different features are shown in conjunction with the description of temporary credit account 400 of FIG. 4, it should be appreciated that some embodiments may include additional features or may skip some of the features altogether. The features of temporary credit account 400 described herein are not intended to limit the subject matter to these embodiments. On the contrary, the subject matter described herein is intended to cover alternatives, modifications and equivalents, which may be included within the spirit and scope as defined by the appended claims.

In one embodiment, the temporary credit account 400 is received at mobile device 401 from credit card generator 330 (of FIG. 3) via a delivery method such as, but not limited to: a text, a mobile push, an interactive kiosk, beacon, etc. and via networks such as near field communication (NFC), Bluetooth, WiFi, or the like.

For example, the credit card generator 330 will send a text message to mobile device 401 which will include the temporary credit account 400 information such that the opening of the text message will result in the display of temporary credit account 400. As described below, a time limit 405 is included with temporary credit account 400. In one embodiment, the time period will begin to toll from the time that the text message is received at mobile device 401. In another embodiment, the time period will begin to toll when the text message is opened at mobile device 401.

In a mobile push scenario, the credit card generator 330 will push the temporary credit account 400 information to mobile device 401, In one embodiment, the result of the push will be the display of temporary credit account 400 on the display of mobile device 401. In one embodiment, the time period will begin to toll from the time that the pushed message is received at mobile device 401.

In another embodiment, the result of the push will be the display of an indicator that temporary credit account 400 has been received and the user will have to interact with the indicator on mobile device 401 before the temporary credit account 400 is displayed in full on mobile device 401. In one embodiment, the time period will begin to toll when temporary credit account 400 is display in full on mobile device 401.

In another embodiment, the result of the push, text message, beacon data reception, etc. will be the receipt of a link to temporary credit account 400. After the link is received, the user will have to follow the link on mobile device 401 to obtain the temporary credit account 400 information. The information would then be display in full on mobile device 401 (e.g., via a download option available at the location provided by the link, via the temporary credit account 400 information downloaded automatically to the mobile device 401 after some type of verification, or the like. In one embodiment, the time period will begin to toll when temporary credit account 400 is displayed on mobile device 401.

In a kiosk scenario, the credit card generator 330 will provide the temporary credit account 400 information to an interactive kiosk and the interactive kiosk will provide the temporary credit account 400 information to mobile device 401. After receiving temporary credit account 400 information from the interactive kiosk, temporary credit account 400 will be displayed on the display of mobile device 401. In one embodiment, the time period will begin to toll from the time that the temporary credit account 400 is received at mobile device 401 from the interactive kiosk.

Temporary credit account 400 has a time limit 405 associated therewith. In general, the time limit 405 is an amount of time that credit account 400 will be valid. While the time limit 405 is active, temporary credit account will be displayable on display screen 402 of mobile device 401. After time limit 405 ends, temporary credit account 400 will no longer be displayed on display screen 402 of mobile device 401. Moreover, at the end of time limit 405, temporary credit account 400 will no longer be a valid way of making a purchase. In one embodiment, the time limit 405 may be a fixed amount of time that is non-extensible. For example, time limit 405 may provide a fixed limit of 1 hour, 2 hours, 1.5 hours, or the like.

In another embodiment, time limit 405 may be a fixed amount of time but may include a limited number of extensions (e.g., 2, 3, or the like). For example, time limit 405 may provide a fixed limit of 30 minutes, 1 hour, 1.5 hours, or the like and may also provide a statement that "the valid time period can be extended x times". In one embodiment, during the last few minutes of the valid time period, there may be an option to extend time limit 405. Thus, if the customer has not finished shopping, the selection of the extension will allow the temporary credit account 400 to remain on screen and valid for use for another valid time period.

In general, time limit 405 is adjustable and can be set for a shorter or longer time period by the brand, or the credit provider. For example, a brand may decide to provide the temporary credit account 400 on the mobile device for a 2 hour time limit with no extensions, for a half hour time period with four extensions, etc. In another example, time limit 405 on the validity of the temporary credit account 400 are credit provider driven and are based on fraud prevention, theft, or the like. For example, the credit provider would designate the temporary credit account 400 to be valid for only 1 hour after issue such that if the consumer lost mobile device 401, the opportunity for fraudulent purchases would be limited to only the 1 hour time limit 405. In other words, time limit 405 is provided to limit fraud or the like due to the loss of the phone or other surreptitious access to the user's mobile device.

In one embodiment, when temporary credit account 400 is received by mobile device 401 it is automatically displayed on the display screen 402 and the amount of time that the pass is valid begins to be tolled. In another embodiment, the time limit 405 begins to run when temporary credit account 400 is displayed on display screen 402 of mobile device 401. In yet another embodiment, the time limit 405 begins to run when temporary credit account 400 is opened and displayed on display screen 402 of mobile device 401.

Information 410 refers to purchase information about the use of temporary credit account 400. The information 410 can include limitations on what can be purchased, e.g., no gift cards, and the like.

Credit limit 421 is the total amount of credit available to the account holder. It is the limit of the actual card and is not indicative of the amount of credit available on the temporary account. Temporary account limit 422 is the amount of money available for the consumer to spend with the temporary credit account 400. The temporary account limit 422 is less than the credit limit and is defined by the credit provider and the brand. For example, the temporary account limit 422 is based on potential for fraud. For example, temporary account limit 422 would likely be directly related to the actual account credit limit 421; e.g., a lower actual credit limit 421 would likely result in a lower temporary account limit 422.

In another embodiment, temporary account limit 422 is based on the type of product sold by the brand, the average ticket size for the brand, and the like. For example, a jewelry store may have a higher temporary account limit 422 than a hardware store.

Temporary account number 423 is a number that is assigned to the temporary account that is linked to the underlying account, but it is not the underlying account number.

Temporary expiration date 424 is generally not related to the underlying account but is instead just for the temporary credit account purchase process. The temporary expiration date 424 can be for the day after the credit account is provided, or it may be for a month or so later. For example, the temporary expiration date 424 may not be the date the temporary credit account is valid as it may make purchases difficult since the expiration date is the date of purchase. As such, the temporary expiration date 424 can be a month or more past the date of the temporary credit account 400 to ensure that the purchase is not rejected due to the temporary expiration date 424.

Similar, to temporary expiration date 424, the temporary security code 425 is also not related to the underlying account specifically, but is instead provided as it may be necessary when utilizing the temporary credit account 400.

In one embodiment, temporary credit account 400 includes a scannable code 430, such as a barcode, QR code, or the like. In one embodiment, instead of having to input the temporary information 421-425 manually, code 430 is scanned by the retailer/clerk at the register or during the time of checkout to provide the temporary account details to the POS.

In one embodiment, temporary credit account 400 includes an animated digital watermark 460 that is displayed on display 402. The term "animated digital watermark", as used herein, is any visually perceptible image that is dynamically moving or animated that facilitates in ensuring that mobile payment card is authentic (or not fraudulent).

Animated digital watermark 460, by being animated, provides visual evidence that temporary credit account 400 is not a fraudulent copy. More specifically, animated digital watermark 460 provides visual evidence that the displayed temporary credit account 400 is not a fraudulent captured static image of the authentic temporary credit account 400.

For example, a merchant visually examining temporary credit account 400 displayed on device 401 will notice the dynamic moving properties of animated digital watermark 460 and determine that temporary credit account 400 is authentic and not fraudulent.

Animated digital watermark 460 can be any image with dynamic (or visually moving/changing) properties. For example, animated digital watermark 460 is a rotating logo of the bank that issued temporary credit account 400. In another example, animated digital watermark 460 is an image that constantly or variably changes shape, color, and/or position.

In various embodiments, animated digital watermark 460 varies based on the day, time, session, etc.

In one embodiment, animated digital watermark 460 is a user-interactive animated digital watermark. For example, a message is displayed in response to a user selecting animated digital watermark 460 on the touch screen display. The displayed message, in response to the touch by the user, provides visual evidence that the displayed temporary credit account 400 is not a fraudulently captured video of the authentic mobile payment card because a captured video of temporary credit account 400 (including animated digital watermark) would not be able to display a message in response to a user touching the animated digital watermark in the fraudulent video.

In one embodiment, temporary credit account 400 also displays a show government issued ID 435 to promote the customer to show identification to the retailer. The information 440 after the show ID provides the APR and account details as well as a link to further information. Information 440 is modifiable and is based on legal requirements, credit provider requirements, consumer information requirements, and the like.

Information 445 provides a summary of the temporary aspects to include the total amount of time the temporary account will be valid; the total number of allowed transactions, and the temporary credit limit. In one embodiment, information 445 is modifiable by brand, credit provider, or the like. In general the total number of allowed transactions is a hard limit on the amount of times the temporary credit account 400 can be used to make purchases. The number may be limited by brand or by credit provider. For example, the temporary credit account would have a limited number of 3 uses. Thus, after the user makes three separate purchases within the valid time frame, the temporary credit account 400 would no longer be valid, even if time and credit remained. Similarly, if the user has used all available temporary credit on the second purchase, then there would be no third purchase capability as the temporary credit account 400 would be invalid due to the temporary credit amount being previously reached.

In one embodiment, information 445 is updated in real time to include the remaining time for account validity, the remaining credit amount, the remaining number of transactions, and the like. Information 450 provides customer information and advice.

In one embodiment, when the temporary account information is provided to the retailer, e.g., a purchase is pending with temporary credit account 400, a number of security checks can be performed based on the temporary account information. For example, the security check can confirm the pending purchase attempted by temporary account number 423 is coming from the brand to which it is related.

In one embodiment, the security checks also include a timing check to ensure that the provided account number is within its valid window and has not expired. The security checks additionally include a number-of-transactions check to ensure the pending transaction is within the amount of allowed transactions, e.g., 3 of 4 versus 5 of 4. The security checks can include a temporary account limit check to ensure the amount of the pending purchase is within the temporary account limit 422, that it remains within the amount remaining of the temporary account limit 422 if other purchases have already been made, etc. E.g., if temporary account limit 422 is $240.00 and a first purchase of 80.00 dollars has been made, the pending purchase amount would have to be less than or equal to the remaining temporary account limit 422 amount, e.g., $160.00.

Referring now to FIG. 5, a flowchart of a method for generating a temporary credit account for display on a display screen of a mobile device is shown in accordance with an embodiment.

With reference now to 502 of FIG. 5, one embodiment displays, on a display 402 of a mobile device 401, a temporary credit account 400, the temporary credit account correlated with a newly approved non-integrated credit account, the temporary credit account including: a temporary account number 423; a temporary expiration date 424; and a temporary security code 425.

Referring now to 504 of FIG. 5, one embodiment incorporates a time constraint 405 into the temporary credit account 400 displayed on the mobile device 401, the time constraint 405 limiting an amount of time the temporary credit account is displayed on the mobile device 401 and limiting an amount of time the temporary credit account is available for making a purchase.

One embodiment, includes an extension to the time constraint 405 with the temporary credit account 400 displayed on the mobile device 401, the extension resetting the time constraint 405 to its initial starting value.

One embodiment, automatically displays the temporary credit account 400 on the display 402 when the temporary credit account is received at the mobile device 401 and automatically initiates the time constraint 405 when the temporary credit account is displayed.

With reference now to 506 of FIG. 5, one embodiment integrates a credit limit reduction 422 into the temporary credit account 400 displayed on the mobile device 401, the credit limit reduction 422 reducing an available credit on the temporary credit account 400 to an amount less than a credit available on the newly approved non-integrated credit account. One embodiment reduces the available credit based on a type of product sold by a brand, and an average ticket size for the brand. One embodiment reduces the available credit based on a fraud protection determination by the credit account provider.

One embodiment incorporates a purchase constraint 445 into the temporary credit account 400 displayed on the mobile device 401, the purchase constraint 445 limiting a number of separate transactions that can be validly made with the temporary credit account. That is, the total number of allowed transactions is a hard limit on the amount of times the temporary credit account 400 can be used to make purchases. The number may be limited by brand or by credit provider. For example, the temporary credit account would have a limited number of 3 uses. Thus, after the user makes three separate purchases within the valid time frame, the temporary credit account 400 would no longer be valid, even if time and credit remained. Similarly, if the user has used all available temporary credit on the second purchase, then there would be no third purchase capability as the temporary credit account 400 would be invalid due to the temporary credit amount being previously reached.

In addition, one embodiment displays an animated digital watermark 460 on the display 402 to ensure authenticity of the limited use temporary credit account 400. In one embodiment, the animated digital watermark 460 is a user-interactive animated digital watermark 460.

One embodiment incorporates a real-time status 445 into the temporary credit account 400 displayed on the mobile device 401, the real-time status 445 providing real-time values for a remaining time of the time constraint 405, a remaining available credit on the temporary credit account, and a remaining number of separate transactions that can be validly made with the temporary credit account.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A method for providing a limited use temporary credit account, the method comprising:
   applying for a credit account, via a mobile device of a customer, the applying being a non-integrated application process that occurs at a location other than a point of sale;
   displaying, on a display of said mobile device, a temporary credit account, said temporary credit account correlated with a newly approved non-integrated credit account, said temporary credit account comprising:

a temporary account number;
a temporary expiration date, wherein said temporary expiration date is backdated to a date earlier than an approval date of said non-integrated credit account; and
a temporary security code;
incorporating a time constraint into said temporary credit account displayed on said mobile device, said time constraint,
   limiting an amount of time said temporary credit account is displayed on said mobile device;
   limiting an amount of time said temporary credit account is available for making a purchase; and
   incorporating a purchase constraint into said temporary credit account, said purchase constraint stopping said temporary credit account from being used to purchase a gift card;
integrating a credit limit reduction into said temporary credit account displayed on said mobile device, said credit limit reduction comprising:
   reducing an available credit on said temporary credit account to an amount less than a credit available on said newly approved non-integrated credit account; and
   reducing said available credit on said temporary credit account based on a type of product sold by a brand, and an average ticket size for said brand;
integrating an animated digital watermark with said temporary credit account displayed on said display of said mobile device, said animated digital watermark to be presented on said display when said temporary credit account is utilized, wherein a touch of said animated digital watermark on said display causes a visual message to be displayed on said display, said visual message to provide evidence that said temporary credit account on said display is not a fraudulent captured video of said temporary credit account on said display; and
making a purchase with said temporary credit account.

2. The method of claim 1, further comprising:
incorporating a purchase constraint into said temporary credit account displayed on said mobile device, said purchase constraint,
   limiting a number of separate transactions that can be validly made with said temporary credit account.

3. The method of claim 1, further comprising:
automatically displaying said temporary credit account on said display when said temporary credit account is received at said mobile device; and
automatically initiating said time constraint when said temporary credit account is displayed.

4. The method of claim 1, further comprising:
including an extension to said time constraint with said temporary credit account displayed on said mobile device, said extension resetting said time constraint to its initial starting value.

5. A device, comprising:
a display;
a memory storing instructions; and
one or more processors, when executing said instructions, to:
   apply for a credit account via a non-integrated application process that occurs via said device at a location other than a point of sale, said device being a customer's device;
   display, on said display, a temporary credit account, said temporary credit account correlated with a newly approved non-integrated credit account, said temporary credit account comprising:
      a temporary account number;
      a temporary expiration date, wherein said temporary expiration date is backdated to a date earlier than an approval date of said non-integrated credit account; and
      a temporary security code;
   incorporate a time constraint into said temporary credit account displayed on said mobile device, said time constraint
      limits an amount of time said temporary credit account is displayed on said mobile device; and
      limits an amount of time said temporary credit account is available for making a purchase;
   integrate a credit limit reduction into said temporary credit account displayed on said mobile device, said credit limit reduction comprising:
   reduce an available credit on said temporary credit account to an amount less than a credit available on said newly approved non-integrated credit account; and
   reduce said available credit on said temporary credit account based on a type of product sold by a brand, and an average ticket size for said brand;
   integrate an animated digital watermark with said temporary credit account displayed on said display of said mobile device, said animated digital watermark to be presented on said display when said temporary credit account is utilized, wherein a touch of said animated digital watermark on said display causes a visual message to be displayed on said display, said visual message to provide evidence that said temporary credit account on said display is not a fraudulent captured video of said temporary credit account on said display; and
   make a purchase with said temporary credit account.

6. The device of claim 5, where said one or more processors, when executing said instructions, are further to:
incorporate a purchase constraint into said temporary credit account displayed on said mobile device, said purchase constraint limits a number of separate transactions that can be validly made with said temporary credit account.

7. The device of claim 5, where said one or more processors, when executing said instructions, are further to:
incorporate a real-time status into said temporary credit account displayed on said mobile device, said real-time status providing real-time values for:
   a remaining time of said time constraint,
   a remaining available credit on said temporary credit account, and
   a remaining number of separate transactions that can be validly made with said temporary credit account.

8. The device of claim 5, where said one or more processors, when executing said instructions, are further to:
automatically display said temporary credit account on said display when said temporary credit account is received; and
automatically initiate said time constraint when said temporary credit account is displayed.

9. The device of claim 5, where said one or more processors, when executing said instructions, are further to:
include an extension to said time constraint with said temporary credit account displayed on said mobile device, said extension resetting said time constraint to its initial starting amount.

10. A non-transitory computer-readable medium for storing instructions, said instructions comprising:
one or more instructions which, when executed by one or more processors, cause one or more processors to:
apply for a credit account via a non-integrated application process that occurs via a mobile device of a customer at a location other than a point of sale;
display, on a display of said mobile device, a temporary credit account, said temporary credit account correlated with a newly approved non-integrated credit account, said temporary credit account comprising:
a temporary account number;
a temporary expiration date; and
a temporary security code;
incorporate a time constraint into said temporary credit account displayed on said mobile device, said time constraint
limits an amount of time said temporary credit account is displayed on said mobile device, and
limit an amount of time said temporary credit account is available for making a purchase; and
integrate a credit limit reduction into said temporary credit account displayed on said mobile device, said credit limit reduction comprising:
reduce an available credit on said temporary credit account to an amount less than a credit available on said newly approved non-integrated credit account; and
reduce said available credit on said temporary credit account based on a type of product sold by a brand, and an average ticket size for said brand;
integrate an animated digital watermark with said temporary credit account displayed on said display of said mobile device, said animated digital watermark to be presented on said display when said temporary credit account is utilized, wherein a touch of said animated digital watermark on said display causes a visual message to be displayed on said display, said visual message to provide evidence that said temporary credit account on said display is not a fraudulent captured video of said temporary credit account on said display; and
make a purchase with said temporary credit account.

11. The non-transitory computer-readable medium of claim 10, where said instructions further comprise:
one or more instructions to:
incorporate a purchase constraint into said temporary credit account displayed on said mobile device, said purchase constraint limits a number of separate transactions that can be validly made with said temporary credit account.

12. The non-transitory computer-readable medium of claim 10, where said instructions further comprise:
one or more instructions to:
incorporate a real-time status into said temporary credit account displayed on said mobile device, said real-time status providing real-time values for:
a remaining time of said time constraint,
a remaining available credit on said temporary credit account, and
a remaining number of separate transactions that can be validly made with said temporary credit account.

13. The non-transitory computer-readable medium of claim 10, where said instructions further comprise:
one or more instructions to:
automatically display said temporary credit account on said display when said temporary credit account is received; and
automatically initiate said time constraint when said temporary credit account is displayed.

\* \* \* \* \*